United States Patent
Endo et al.

(10) Patent No.: US 10,047,691 B2
(45) Date of Patent: Aug. 14, 2018

(54) FUEL INJECTION CONTROLLING APPARATUS

(71) Applicant: HONDA MOTOR CO., LTD., Tokyo (JP)

(72) Inventors: Yohei Endo, Wako (JP); Yasuhiro Nozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/259,230

(22) Filed: Sep. 8, 2016

(65) Prior Publication Data

US 2017/0082048 A1 Mar. 23, 2017

(30) Foreign Application Priority Data

Sep. 18, 2015 (JP) .................................. 2015-185450

(51) Int. Cl.
| | |
|---|---|
| *F02D 41/02* | (2006.01) |
| *F16H 63/50* | (2006.01) |
| *F16H 61/04* | (2006.01) |
| *B60W 30/19* | (2012.01) |
| *F02D 41/12* | (2006.01) |

(52) U.S. Cl.
CPC .......... *F02D 41/023* (2013.01); *B60W 30/19* (2013.01); *F16H 61/04* (2013.01); *F16H 63/50* (2013.01); *F16H 63/502* (2013.01); *F02D 41/123* (2013.01); *F16H 2061/047* (2013.01); *F16H 2061/0477* (2013.01)

(58) Field of Classification Search
None
See application file for complete search history.

(56) References Cited

U.S. PATENT DOCUMENTS

| | | | | |
|---|---|---|---|---|
| 2002/0112902 | A1* | 8/2002 | Wakashiro | B60K 6/485 180/65.26 |
| 2005/0178592 | A1* | 8/2005 | Yamamoto | B60W 10/08 180/65.285 |
| 2010/0036574 | A1* | 2/2010 | Hopp | B60W 10/026 701/68 |
| 2015/0184745 | A1* | 7/2015 | Arai | F16H 61/0437 477/107 |

FOREIGN PATENT DOCUMENTS

| | | |
|---|---|---|
| JP | 5-1584 A | 1/1993 |
| JP | 2005-163759 A | 6/2005 |

* cited by examiner

*Primary Examiner* — Ramya P Burgess
*Assistant Examiner* — Timothy Hannon
(74) *Attorney, Agent, or Firm* — Birch, Stewart, Kolasch & Birch, LLP

(57) ABSTRACT

A fuel injection controlling apparatus includes a fuel cut controlling unit applied to an engine and a transmission to perform a fuel cut control of a fuel injection apparatus upon shifting of the transmission. A shift state detection unit decides a shift state. The fuel cut controlling unit changes a decision threshold value to be used for decision of whether or not the fuel cut control is to be ended in response to the shift state detected by the shift state detection unit. A dog clutch type transmission is configured to select an arbitrary one of a plurality of transmission gear pairs through engagement or disengagement of a dog clutch configured from dowels and dowel holes. The shift state is indicated by a length of a dowel abutment time period for which a state in which the dowels abut with a side wall of a transmission gear upon shifting continues.

18 Claims, 8 Drawing Sheets

<NORMAL STATE ΔNe TABLE 4>

<LONG DOWEL ABUTMENT STATE ΔNe TABLE 5>

FUEL INJECTION CONTROLLING APPARATUS

CROSS-REFERENCE TO RELATED APPLICATIONS

The present application claims priority under 35 USC 119 to Japanese Patent Application No. 2015-185450 filed Sep. 18, 2015 the entire contents of which are hereby incorporated by reference.

1. Field of the Invention

The present invention relates to a fuel injection controlling apparatus, and particularly to a fuel injection controlling apparatus which executes fuel cut control in order to prevent a racing phenomenon of the engine speed upon shifting.

2. Description of Background Art

A fuel injection apparatus is known wherein fuel is supplied to a power unit which transmits power of an engine to a stepped transmission through a clutch. The fuel injection is cut automatically when a predetermined condition upon slowdown or upon shifting is satisfied.

Japanese Patent Laid-Open No. 2005-163759 discloses a fuel injection controlling apparatus which delays, upon slowdown with a throttle closed fully, the timing for cutting the fuel thereby to avoid that a slowdown feeling becomes excessively strong and changes, upon shifting up with the throttle opened, the timing at which the fuel cut is delayed in response to an engagement state of a clutch thereby to prevent racing of the engine speed.

In a sequential type stepped transmission which uses a shift drum, a structure is applied wherein an arbitrary transmission gear pair is selected from a plurality of transmission gear pairs by engaging or disengaging a dog clutch configured from a plurality of dowels (protrusions) and corresponding dowel holes provided between adjacent ones of the transmission gears.

In a transmission to which the dog clutch is applied, a phenomenon called "dowel abutment" in which, upon shifting, the dowels abut with a side wall of an opposing transmission gear and are not admitted into the dowel holes sometimes occurs, resulting in increase in the time after starting till completion of the shifting from that in ordinary clutch engagement.

The technology disclosed in Japanese Patent Laid-Open No. 2005-163759 takes, when a fuel cut control is executed, the engagement state of the clutch into consideration. However, the technology is not influenced by a variation of the shift time period by the "dowel abutment" phenomenon which should be taken into consideration.

SUMMARY AND OBJECTS OF THE INVENTION

It is an object of an embodiment of the present invention to provide a fuel injection controlling apparatus which solves the problem of the prior art described above wherein an execution of a fuel cut control takes a dowel abutment phenomenon into consideration upon shifting in a stepped transmission in which a dog clutch is used.

In order to achieve the object described above, according to an embodiment of the present invention, a fuel injection controlling apparatus includes a fuel cut controlling unit (3) applied to a power unit (P) which includes an engine (E) and a transmission (TM) of a stepped type which is configured to perform a fuel cut control of a fuel injection apparatus (11) upon shifting of the transmission (TM). A shift state detection unit (7) is configured to decide a shift state of the transmission (TM). Further, the fuel cut controlling unit (3) is configured to change a decision threshold value to be used for decision of whether or not the fuel cut control is to be ended in response to the shift state detected by the shift state detection unit (7).

According to an embodiment of the present invention, the transmission (TM) is a dog clutch type transmission configured to select an arbitrary one of a plurality of transmission gear pairs (G1 to G5, GR) through engagement or disengagement of a dog clutch configured from dowels and dowel holes, and the shift state is indicated by a length of a dowel abutment time period (Td1, Td2) for which a state in which the dowels abut with a side wall of a transmission gear upon shifting continues.

According to an embodiment of the present invention, a shift drum position sensor (87) is configured to detect a rotational angle of a shift drum (70) of the transmission (TM), and a shift spindle position sensor (88) is configured to detect a rotational angle of a shift spindle (82) for rotating the shift drum (70). Further, the decision of whether or not the dog clutch is in a dowel abutment state is performed by a comparison between an output signal of the shift drum position sensor (87) and an output signal of the shift spindle position sensor (88).

According to an embodiment of the present invention, the decision threshold value to be used for a decision of whether or not the fuel cut control is to be ended is given as a speed difference ($\Delta Ne$) between an engine speed (Ne) at present and a target engine speed (NeN) of the gear after shift up shifting.

According to an embodiment of the present invention, when the dowel abutment time period (Td2) is long, the speed difference ($\Delta NeA$, $\Delta NeB$) is set smaller than that when the dowel abutment time period (Td1) is short.

According to an embodiment of the present invention, the fuel cut controlling unit (3) decides that the dowel abutment time period (Td2) is long when the dowel abutment time period (Td1, Td2) exceeds a maximum dowel abutment time period (Tc) set in advance.

According to an embodiment of the present invention, when a duration after the fuel cut control is started exceeds a minimum cut time period (Ta) set in advance, the fuel cut controlling unit (3) decides whether or not the dog clutch is in the abutment state. When the duration is equal to or shorter than the speed difference ($\Delta Ne$) and the dog clutch is not in the dowel abutment state, the fuel cut controlling unit (3) ends the fuel cut control.

According to an embodiment of the present invention, the fuel cut controlling unit (3) is configured such that it changes the decision threshold value to be used for a decision of whether or not the fuel cut control is to be ended in response to the shift state detected by the shift state detection unit (7). Therefore, irrespective of the shift state of the transmission, a shift shock or racing of the engine speed upon shifting can be prevented.

According to an embodiment of the present invention, the transmission (TM) is a dog clutch type transmission configured to select an arbitrary one of the plurality of transmission gear pairs (G1 to G5, GR) through engagement or disengagement of the dog clutch configured from the dowels and the dowel holes. Further, the shift state is indicated by the length of the dowel abutment time period (Td1, Td2) for which the dowel abutment state in which the dowels abut with a side wall of a transmission gear upon shifting continues. Therefore, irrespective of whether the dowel abutment time period upon shifting is long or short, a shift shock or racing of the engine speed upon shifting can be prevented.

According to an embodiment of the present invention, the fuel injection controlling apparatus further includes the shift drum position sensor (87) configured to detect the rotational angle of the shift drum (70) of the transmission (TM), and the shift spindle position sensor (88) configured to detect the rotational angle of the shift spindle (82) for rotating the shift drum (70). Further, the decision of whether or not the dog clutch is in the dowel abutment state is performed by a comparison between the output signal of the shift drum position sensor (87) and the output signal of the shift spindle position sensor (88). Therefore, the dowel abutment state can be detected with high accuracy using the two sensors. Further, since the sensors provided originally are used so as to be used for control of the engine or the clutch, there is no necessity to provide new sensors.

According to an embodiment of the present invention, the decision threshold value to be used for a decision of whether or not the fuel cut control is to be ended is given as the speed difference ($\Delta$Ne) between the engine speed (Ne) at present and the target engine speed (NeN) of the gear after shift up shifting. Therefore, the condition for ending the fuel cut control can be determined by an arithmetic operation based on the output of the engine speed sensor and a value derived from a shift map. Thus, it is possible to enhance the accuracy in control for ending the fuel cut.

According to an embodiment of the present invention, when the dowel abutment time period (Td2) is long, the speed difference ($\Delta$NeA, $\Delta$NeB) is set smaller than that when the dowel abutment time period (Td1) is short. Therefore, it is possible to delay the end timing of the fuel cut control in response to an event wherein the dowel abutment time period becomes long. Consequently, in the power unit in which the transmission clutch is interlocked with a rotational movement of the shift drum, it becomes possible to avoid such a situation that the fuel cut control is ended in a state in which the transmission clutch still remains disengaged and the engine speed indicates racing during the shifting.

According to an embodiment of the present invention, the fuel cut controlling unit (3) decides that the dowel abutment time period (Td2) is long when the dowel abutment time period (Td1, Td2) exceeds the maximum dowel abutment time period (Tc) set in advance. Therefore, shifting can be performed without excessively lowering the engine speed.

According to an embodiment of the present invention, when the duration after the fuel cut control is started exceeds the minimum cut time period (Ta), the fuel cut controlling unit (3) decides whether or not the dog clutch is in the abutment state, and when the duration is equal to or shorter than the speed difference ($\Delta$Ne) and the dog clutch is not in the dowel abutment state, the fuel cut controlling unit (3) ends the fuel cut control. Therefore, shifting can be suitably performed by the speed difference and the fitting state of the dog clutch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
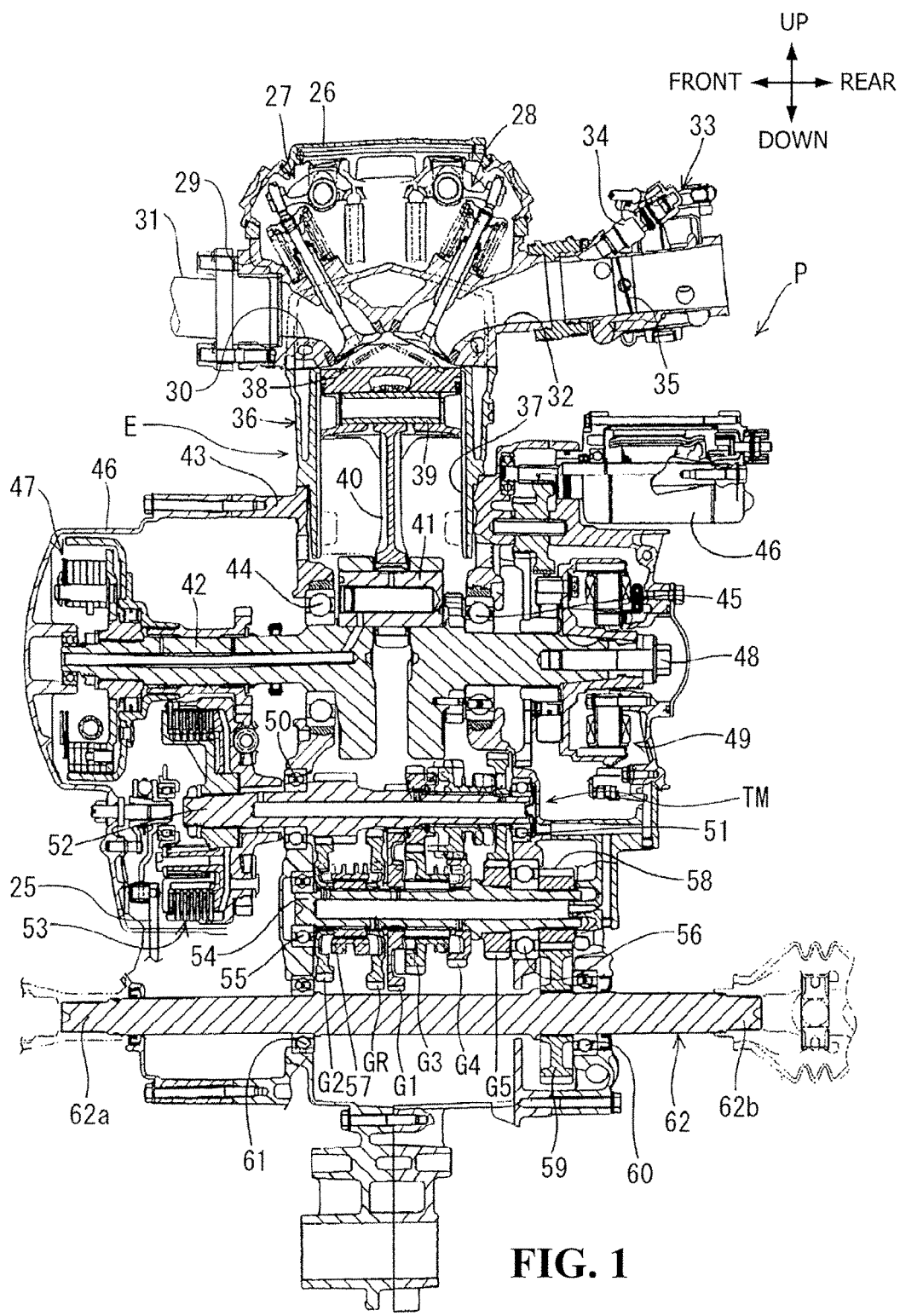
FIG. 1 is a sectional view of a power unit to which a fuel injection controlling apparatus according to an embodiment of the present invention is applied.

In the following, a preferred embodiment of the present invention is described with reference to the drawings. FIG. 1 is a sectional view of a power unit P to which a fuel injection controlling apparatus according to an embodiment of the present invention is applied. The four arrows in FIG. 1 correspond to directions with regard to a vehicle in which the power unit P is incorporated.

The power unit P includes an engine E of the four-cycle single cylinder type, and an electrical change type stepped transmission TM having five forward speeds and one rearward speed. A starting clutch 47 and a transmission clutch 53 are provided between a crankshaft 42 and the transmission TM. The starting clutch 47 is formed from a centrifugal clutch which does not transmit a driving force until an engine speed Ne exceeds a predetermined value. The transmission clutch 53 engages and disengages the driving force transmission in an interlocking relationship with an action of a transmission mechanism C (refer to FIG. 2) which is driven by a transmission motor 78. This makes starting and shifting actions possible without the necessity for a manual clutch operation. A clutch operation arm 25 for operating the transmission clutch 53 to engage and disengage in an interlocking relationship with the transmission mechanism C is connected to the transmission clutch 53.

A piston 38 is accommodated for sliding movement in a sleeve 37 embedded in a cylinder block 36 of the engine E. The piston 38 is supported for rotation at one end of a connecting rod 40 by a piston pin 39, and the other end of the connecting rod 40 is supported for rotation on the crankshaft 42 through a crankpin 41. A cylinder head 29 is attached to an upper portion of the cylinder block 36 and has an intake valve system 28 and an exhaust valve system 27 accommodated therein.

An injector 34, as a fuel injection apparatus and a throttle body 33 having a throttle valve 35, are attached to the upstream side of an intake port 32 of the cylinder head 29. Meanwhile, an exhaust pipe 31 connected to a muffler is attached to the downstream side of the exhaust port 30. A cylinder head cover 26 is attached to an upper portion of a rocker arm which drives the intake and exhaust valves.

The crankshaft 42 is supported for rotation by bearings 44 and 45 provided on a crankcase 43. An alternating-current (AC) generator 49 is fixed to a right end portion in FIG. 1 of the crankshaft 42 by a bolt 48. Power of a starter motor 46 is transmitted to the crankshaft 42 through a gear positioned between the bearing 45 and the AC generator 49.

A clutch cover 91 is provided on the left side in FIG. 1 of the crankcase 43, and the starting clutch 47 is attached to a left end portion in FIG. 1 of the crankshaft 42. If the speed of rotation of the crankshaft 42 exceeds a predetermined value, then the starting clutch 47 transmits the rotational power of the crankshaft 42 to a main shaft 52 of the transmission. The power inputted to the main shaft 52 supported for rotation by bearings 50 and 51 is slowed down by a transmission gear pair provided between the main shaft 52 and a countershaft 54.

On the countershaft 54 supported for rotation by bearings 55 and 56, a second speed driven gear G2, a reverse driven gear GR, a first speed driven gear G1, a third speed driven gear G3, a fourth speed driven gear G4, and a fifth speed driven gear G5 are disposed in order from the left side in FIG. 1. Thus, a transmission gear pair for transmitting power is changed over in response to an action of a shift sleeve 57, which is mounted for sliding movement in an axial direction, or the like.

The power slowed down by a predetermined transmission gear pair is transmitted from a driving side output power gear 58 attached to a right end portion in FIG. 1 of the countershaft 54 to a final output power shaft 62 through a driven side output power shaft 59. The final output power shaft 62 is supported for rotation by bearings 60 and 61. A front side end portion 62a of the final output power shaft 62 is connected to a front side propeller shaft of the vehicle while a rear side end portion 62b of the final output power shaft 62 is connected to a rear side propeller shaft.

Figure 2:
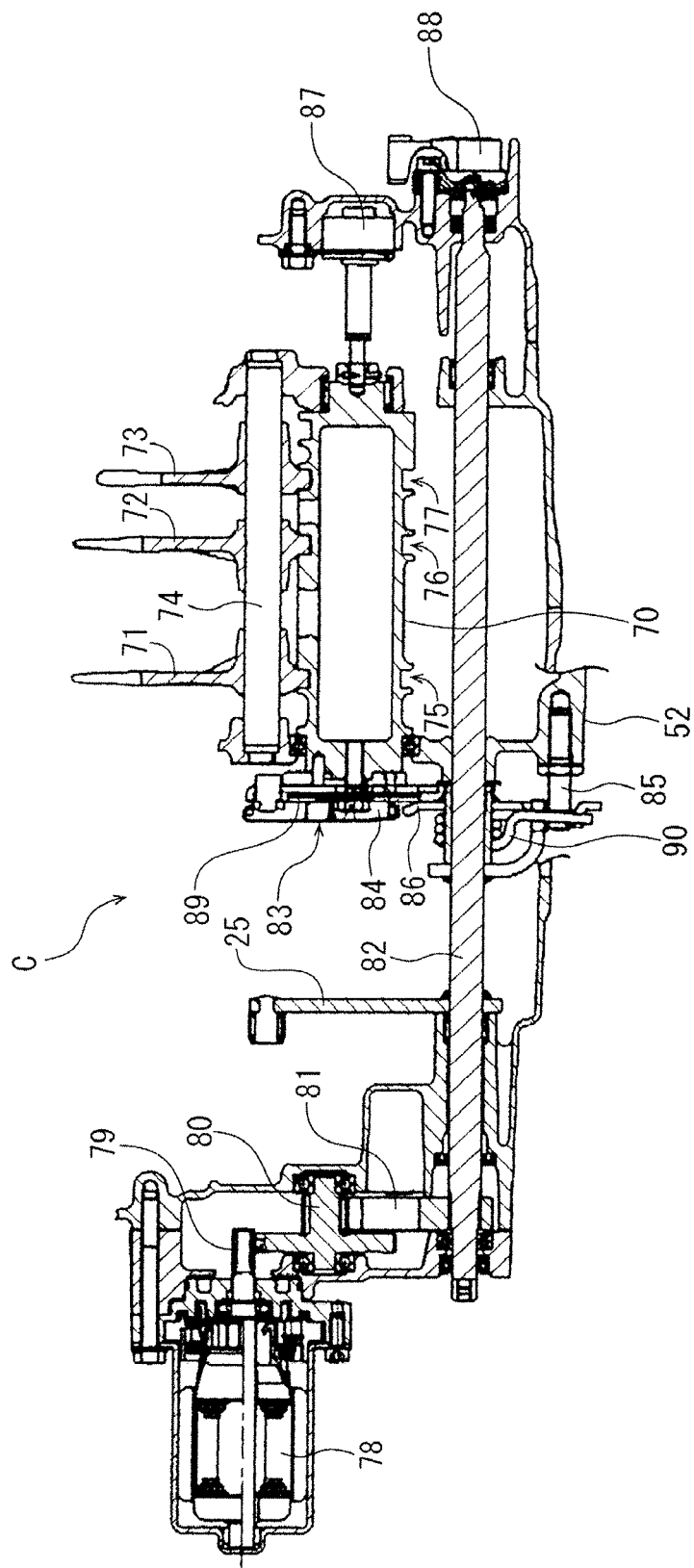
FIG. 2 is a sectional view of a transmission mechanism of a transmission.

FIG. 2 is a sectional view of the transmission mechanism C of the transmission TM. A shift drum 70 of a hollow cylindrical shape is supported for rotation on the crankcase 43. The shift drum 70 is disposed in parallel to an axial direction of a power transmission apparatus. Shift forks 71, 72, and 73 for rotating the shift drum 70 are supported for sliding movement in the axial direction on a fork shaft 74. The shift drum 70 has lead grooves 75, 76, and 77 formed on an outer circumferential face thereof for engaging with cylindrical protrusions formed at lower end portions of the shift forks 71, 72, and 73. Consequently, if the shift drum 70 is rotated, then an engaging state of the dog clutch provided between each adjacent one of the transmission gears G1 to G5 and GR by a tip end portion of the three shift forks is changed.

Figure 3:
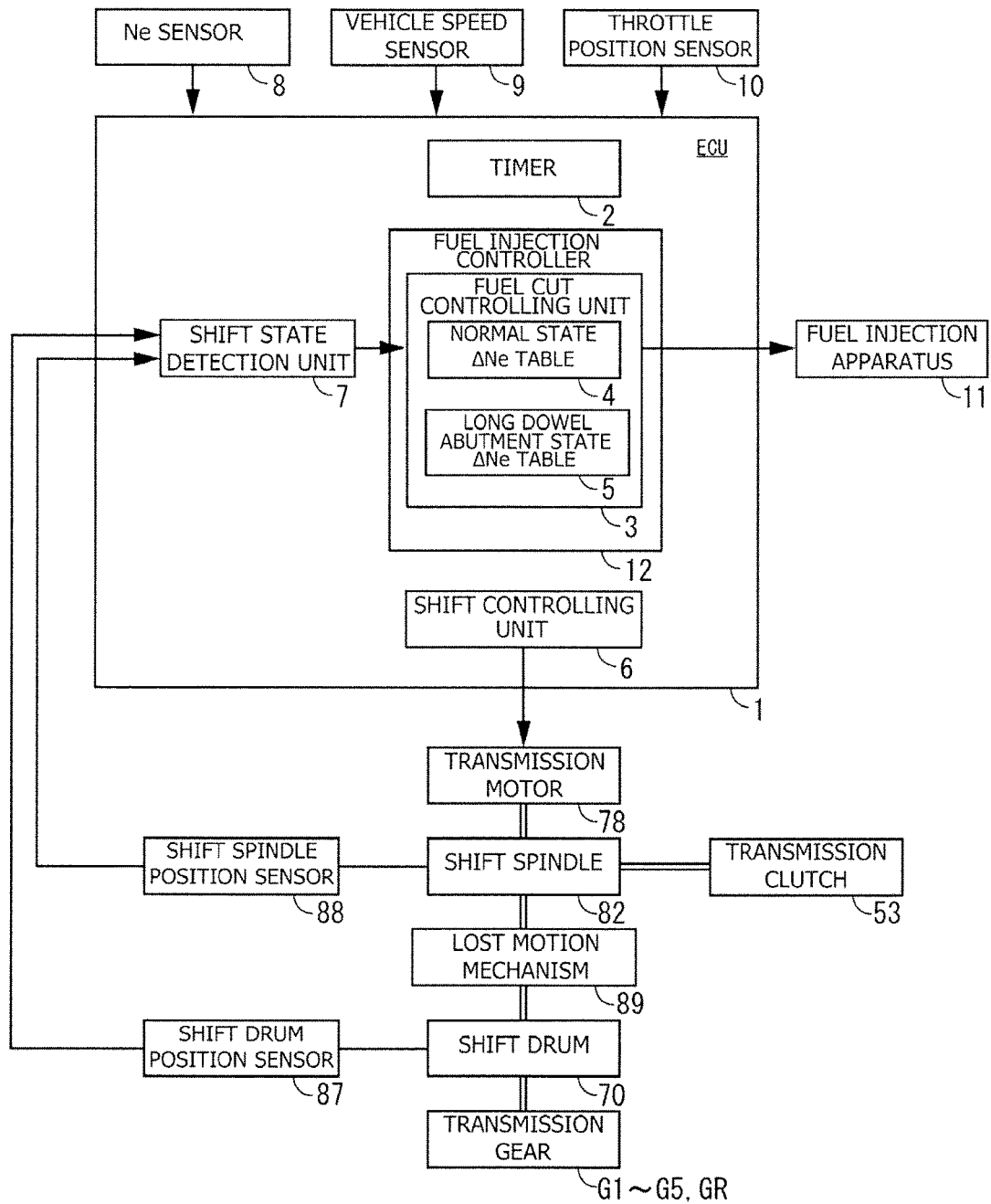
FIG. 3 is a block diagram depicting a configuration of an electronic control unit (ECU) and peripheral apparatus.

The rotational movement of the shift drum 70 is performed by the transmission motor 78 which is controlled to drive by a shift controlling unit (refer to FIG. 3). Rotational driving force of the transmission motor 78 is transmitted from an output power shaft 79 to a shift spindle 82 through an intermediate gear 80 and a sector gear 81. A shift arm 86 in the form of a plate is fixed to the shift spindle 82 such that, if the shift arm 86 performs a reciprocating forward and reverse rotational movement by a predetermined angle, then the shift drum 70 is rotated by a predetermined angle in one direction through a change feed mechanism 83.

Further, the clutch operation arm 25 for operating the transmission clutch 53 (refer to FIG. 1) is fixed to the shift spindle 82. Consequently, the transmission clutch 53 is driven in a disengaging direction when the shift spindle 82 rotates, but is driven in an engaging direction in an interlocking relationship with an action of the shift spindle 82 returning to its initial position.

A lost motion mechanism 89 is provided between the change feed mechanism 83 and the shift drum 70. The lost motion mechanism 89 is a mechanism for protecting the transmission motor 78 when, even if the shift spindle 82 is rotated, the shift drum 70 cannot rotate to a predetermined position because "dowel abutment" in which the dowels of the dog clutch are not admitted into the dowel holes occurs. In particular, if "dowel abutment" occurs, then a rotational movement of the shift spindle 82 is absorbed by a spring member such that, when the transmission gear is rotated to a position at which the dowels are admitted into the dowel holes, the remaining rotational movement is performed by the biasing force of the spring member.

A drum center 84 is fixed against rotation on the shift drum 70 and has a function of providing a decency to the changeover action of the predetermined rotational position of the shift drum 70. A return spring 90 is provided between the shift spindle 82 and a guide pin 85 such that it provides a biasing force for returning the shift arm 86 to its initial position.

A shift drum position sensor 87 is provided at a right end portion in FIG. 2 of the shift drum 70 and serves as a rotational angle detection switch for detecting a shift stage at present on the basis of the rotational position of the shift drum 70. A shift spindle position sensor 88 is provided at a right end portion of the shift spindle 82 and serves as a rotational angle sensor. The shift drum position sensor 87 is a multi-contact switch which outputs a rotational position of the shift spindle 82 only when the shift spindle 82 is at a predetermined rotational position corresponding to a predetermined shift stage whereas it does not output a sensor output at an intermediate position between different shift stages.

Consequently, even if it is detected by the shift spindle position sensor 88 that the shift spindle is rotated by a predetermined angle, if a sensor output corresponding to a next stage gear is not provided from the shift drum position sensor 87, then it can be estimated and detected that "dowel abutment" occurs. Further, if a sensor output corresponding to the next stage gear is obtained later from the shift drum position sensor 87, then it is detected that the "dowel abutment" is cancelled and the shifting to the next stage gear is completed.

FIG. 3 is a block diagram depicting a configuration of an ECU 1 as a control unit and peripheral apparatus. It is to be noted that the fuel injection controlling apparatus according to the present invention signifies, in the narrow sense, a fuel injection controller 12, but in the broad sense, all elements including the ECU 1 and peripheral apparatus.

The ECU 1 is configured so as to execute the fuel cut control at a predetermined timing in order to prevent the engine speed Ne from racing at the moment at which the transmission clutch 53 is disengaged in response to rotation of the shift spindle 82 upon shift up shifting particularly in a state in which the throttle is open. The fuel cut control is executed by stopping fuel injection from a fuel injection apparatus 11 for a predetermined period of time or by thinning out injection to reduce the injection amount.

The present invention solves the problem that, when the fuel cut control described above ends to re-start fuel injection, if engagement of the transmission clutch 53 continues due to "dowel abutment," then fuel injection is re-started in a state in which the transmission clutch 53 is disengaged and racing of the engine speed Ne occurs in the course of shifting.

The ECU 1 includes a timer 2 for measuring a predetermined period of time, the fuel injection controller 12 for controlling driving of the fuel injection apparatus 11, a shift state detection unit 7, and a shift controlling unit 6. The shift state detection unit 7 detects a shift state of the transmission TM on the basis of output signals of the shift spindle position sensor 88 and the shift drum position sensor 87. The shift controlling unit 6 drives the transmission motor 78 at a predetermined timing to perform shifting of the transmission TM.

The shift controlling unit 6 controls driving of the transmission motor 78 on the basis of sensor signals from an Ne sensor 8 for detecting the engine speed Ne, a vehicle speed sensor 9 for detecting the speed of the vehicle, and a throttle position sensor 10 and information from the shift state detection unit 7. As described hereinabove, the transmission clutch 53 is disengaged in response to a rotational movement of the shift spindle 82 connected to the transmission motor 78 to allow a smooth shifting action. It is to be noted that, although the transmission TM in the present embodiment assumes automatic control by which a shifting action is performed automatically on the basis of a shift map determined in advance, the transmission TM may otherwise include a shift operation switch such that it is controlled by semiautomatic control in which intervention of a shift request by an occupant is accepted through the shift operation switch.

The fuel injection controller 12 controls driving of the fuel injection apparatus 11 on the basis of the sensor signals from the Ne sensor 8 for detecting the engine speed Ne, the vehicle speed sensor 9 for detecting the speed of the vehicle, and the throttle position sensor 10 and information from the shift state detection unit 7.

The fuel injection controller 12 includes a fuel cut controlling unit 3 for performing fuel cut control at a predetermined timing. The fuel cut control in the present embodiment is executed if fuel cut starting conditions are satisfied including a condition 1 wherein the gear position before shifting is one of the first to fourth speeds, a condition 2 wherein a shift up instruction is received (in the case of automatic control, that a shifting timing based on a shift map comes), a condition 3 wherein the throttle opening is equal to or greater than a predetermined value, and a condition 4 wherein the engine speed Ne is equal to or higher than a predetermined value.

The fuel cut controlling unit 3 includes a normal state ΔNe table 4 and a long dowel abutment state ΔNe table 5. The normal state ΔNe table 4 is used to derive a parameter ΔNeA for determining a timing at which fuel cut control is to be ended in a normal state (in which no dowel abutment occurs). The long dowel abutment state ΔNe table 5 is used to derive a parameter ΔNeB for determining a timing at which fuel cut control is to be ended upon dowel abutment. Since the two tables 4 and 5 are used in the present embodiment, racing of the engine speed Ne can be prevented in both of a normal state and a dowel abutment state.

Figure 4A:
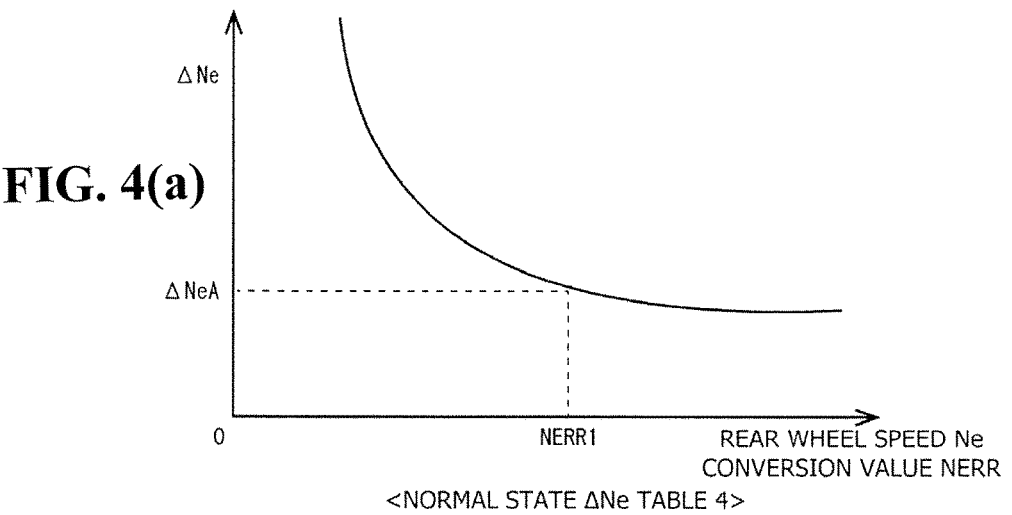
FIGS. 4(a) and 4(b) depict a normal state $\Delta$Ne table and a dowel abutment state $\Delta$Ne table.
Figure 4B:
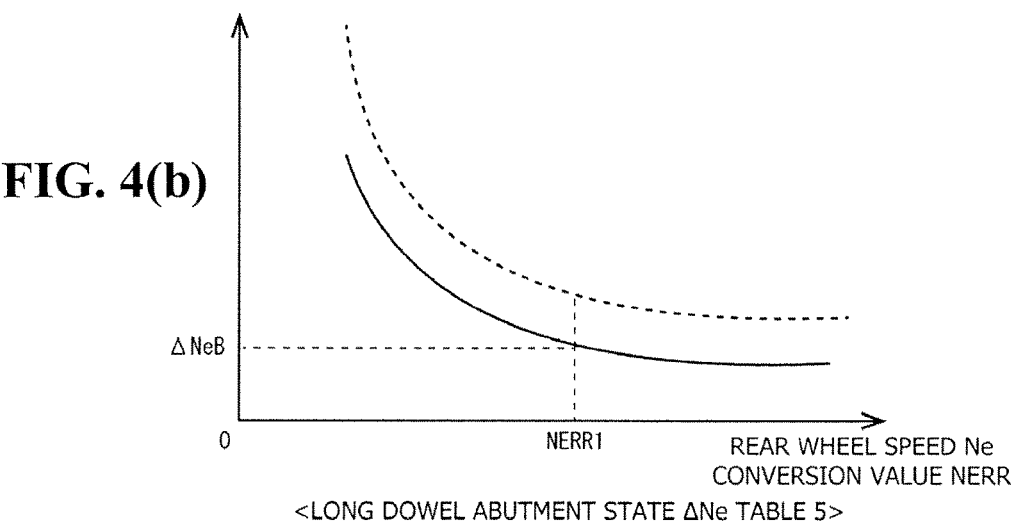

FIG. 4 (a) depicts the normal state ΔNe table 4 and FIG. 4(b) the long dowel abutment state ΔNe table 5. In the present embodiment, upon shift up which involves the fuel cut control, the normal state ΔNe table 4 is used to derive the parameter ΔNeA and the long dowel abutment state ΔNe table 5 is used to derive the parameter ΔNeB in advance. When dowel abutment occurs, the parameter ΔNeB is applied, but when dowel abutment does not occur, the parameter ΔNeA is applied, to determine an end timing of the fuel cut control. The two tables are configured such that, when rear wheel speed NE conversion values NERR which are parameters of the axis of abscissa (engine speeds each calculated from a rear wheel speed and a transmission gear ratio) are equal (for example, NERR1), the parameter ΔNeB derived from the long dowel abutment state ΔNe table 5 is lower than the parameter ΔNeA derived from the normal state ΔNe table 4. In other words, when the dowel abutment time period is long, the speed difference as a decision threshold value is set lower than that in the case where the dowel abutment time period is short.

In the following, a flow of the fuel cut control is described with reference to time charts of FIGS. 5 to 7. In the time charts, a shift up instruction definite flag (0 or 1), a next stage gear shift drum position signal (on or off), the engine speed Ne, fuel cut (on or off), and a shift spindle angle (initial position to maximum angle) are indicated in order from above. An example in which shift up from the second speed to the third speed is performed is illustrated.

At time t=0, the engine speed Ne is increasing with a throttle opening equal to or greater than a predetermined position at the second speed gear position. At this time, the shift up instruction definite flag is 0 (zero) and the shift drum position signal of the third speed gear position is off (because the second speed gear position is selected), the fuel cut is off and the shift spindle angle is the initial position.

Then, at time t1, the shift up instruction definite flag changes to 1, and thereupon, all of the fuel cut control starting conditions are satisfied. Therefore, the fuel cut control is started, and rotation of the shift spindle 82 is started. Also derivation of the parameter ΔNeA is performed at this timing. It is assumed that derivation of the parameter ΔNeB by the control of the present application is not performed.

At time t2, the shift spindle angle reaches the maximum angle, and at time t3, the shift drum position signal of the third speed gear position is changed over to an on state. Consequently, it can be estimated and detected that, during the period from time t2 to time t3, dowel abutment occurs although this is in a short period of time (dowel abutment time period Td1).

Then at time t3, control for returning the shift spindle 82 to its initial position is started in response to completion of the rotational movement of the shift drum 70. In the present embodiment, the period of time from time t1 at which the shift spindle 82 starts rotation to time t7 at which the shift spindle 82 returns to its initial position is determined as shift time period Th.

In order to shorten the shift time period Th, the shift spindle 82 rotates at a maximum speed from time t1 to time t2 at which the maximum angle is reached. On the other hand, when the shift spindle 82 is to be returned from the maximum angle position to the initial position, in order to achieve both a reduction of the shift time period Th and a reduction of a shift shock, the shift spindle 82 is rotated first at the maximum speed till time t4 at which a half clutch region of the transmission clutch 53 starts, and then, in the half clutch region, the rotational speed of the shift spindle 82 is gradually decreased to execute control for gradually engaging the transmission clutch 53.

Figure 5:
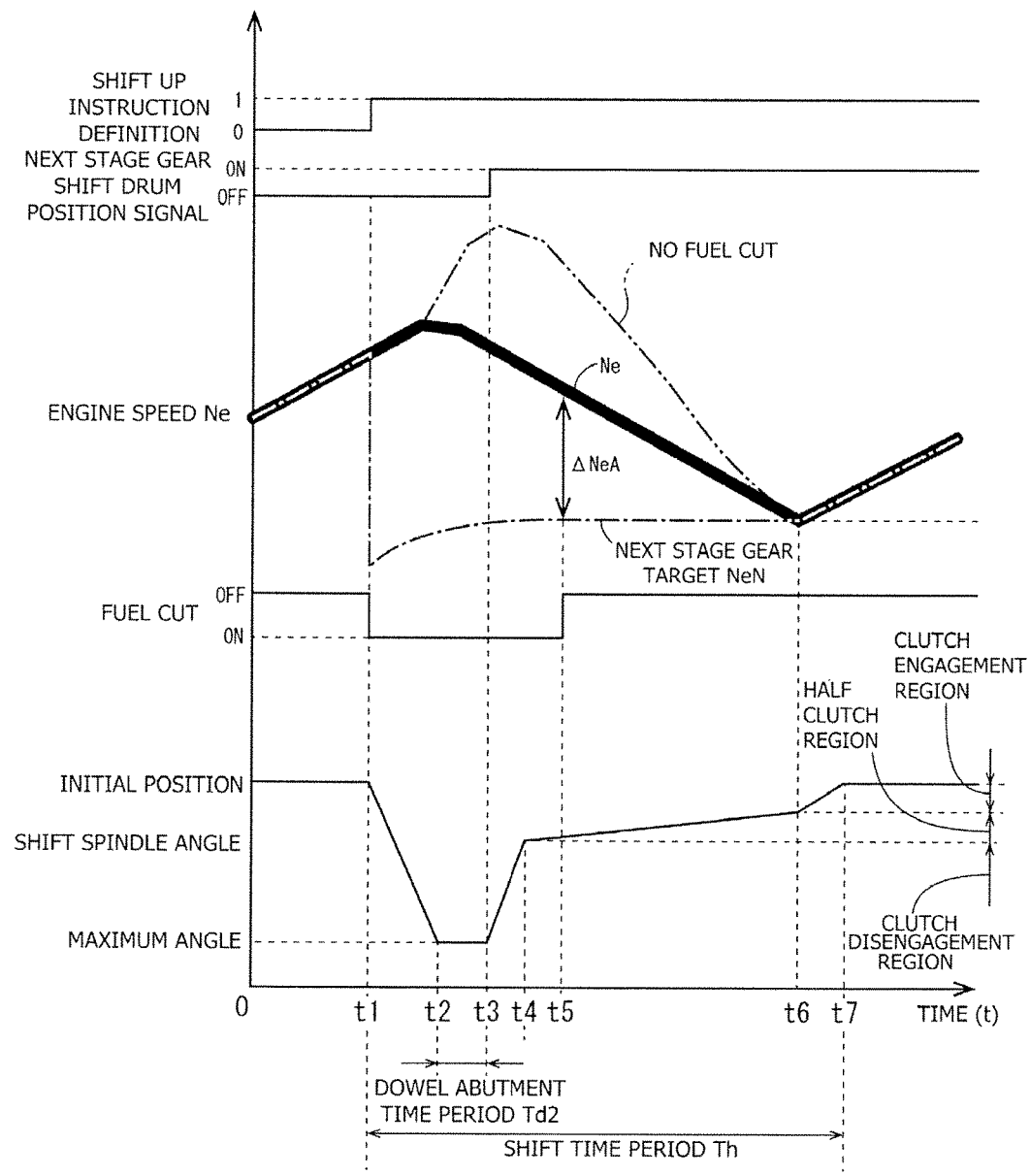
FIG. 5 is a time chart illustrating a flow of fuel cut control (without dowel abutment)

In the example illustrated in FIG. 5, the shift spindle 82 is rotated at the maximum speed within the period from time t3 to time t4 and then rotated at a lower speed within the period from time t4 to time t6. At this time, the fuel cut control is ended at a point in time at which the engine speed Ne decreases until the difference between the engine speed Ne (thick solid line) and a next stage gear target NeN (thin alternate long and short dash line) becomes equal to the value $\Delta$NeA. Consequently, fuel injection is re-started at time t5 at which the transmission clutch 53 is in the half clutch region already, and the engine speed Ne thereafter decreases smoothly. Further, within the period from time t6 at which the transmission clutch 53 is placed into an engaged state to time t7 at which the shift spindle 82 returns to its initial position, the shift spindle 82 is rotated at a predetermined speed which varies in accordance with the shift time period Th determined in advance.

Figure 6:
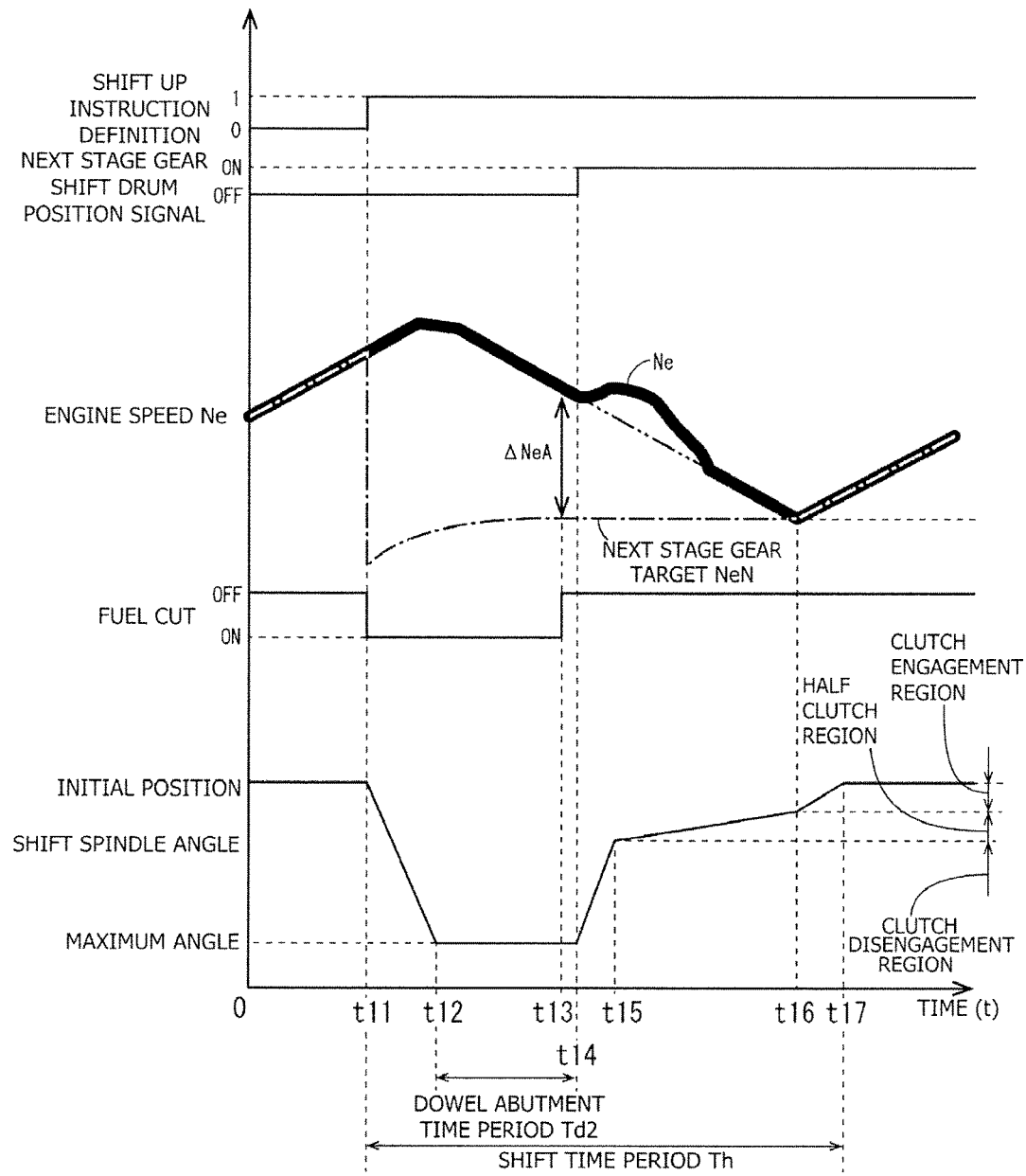
FIG. 6 is a time chart illustrating another flow of fuel cut control (upon occurrence of racing caused by dowel abutment)

FIG. 6 depicts a flow when the engine speed Ne indicates racing midway of shifting because dowel abutment occurs. The determination of whether or not dowel abutment occurs is performed by comparison with a predetermined value determined in advance. Within the extent of a dowel abutment time period Td1 depicted in FIG. 5, the problem that the engine speed Ne indicates racing does not occur, and therefore, it is decided that dowel abutment does not occur. In the example of FIG. 6, a dowel abutment time period Td2 is longer than a predetermine value, and therefore, it is decided that dowel abutment occurs (the dowel abutment time period is long).

In the example of FIG. 6, after fuel cut is started and rotation of the shift spindle 82 is started at time t11, the dowel abutment time period Td2 is elongated, and therefore, the engine speed Ne exhibits racing. This is because, since the parameter $\Delta$NeA derived at time t11 is equal in value to that of the example of FIG. 5, the fuel cut control ends at time t13 (fuel injection is re-started) while the transmission clutch 53 remains disengaged because the dowel abutment state continues till time t14. In other words, since fuel injection is started in the state in which the transmission clutch 53 is disengaged, the engine speed Ne comes to race.

It is to be noted that, in order to make the shift time period Th from time t11 to time t17 fixed (make the shift time period Th equal in value to that of the example of FIG. 5) irrespective of whether or not a dowel abutment phenomenon occurs, the rotational speed of the shift spindle 82 within the period from time t15 to time t16 is made higher than that of the example of FIG. 5.

Figure 7:
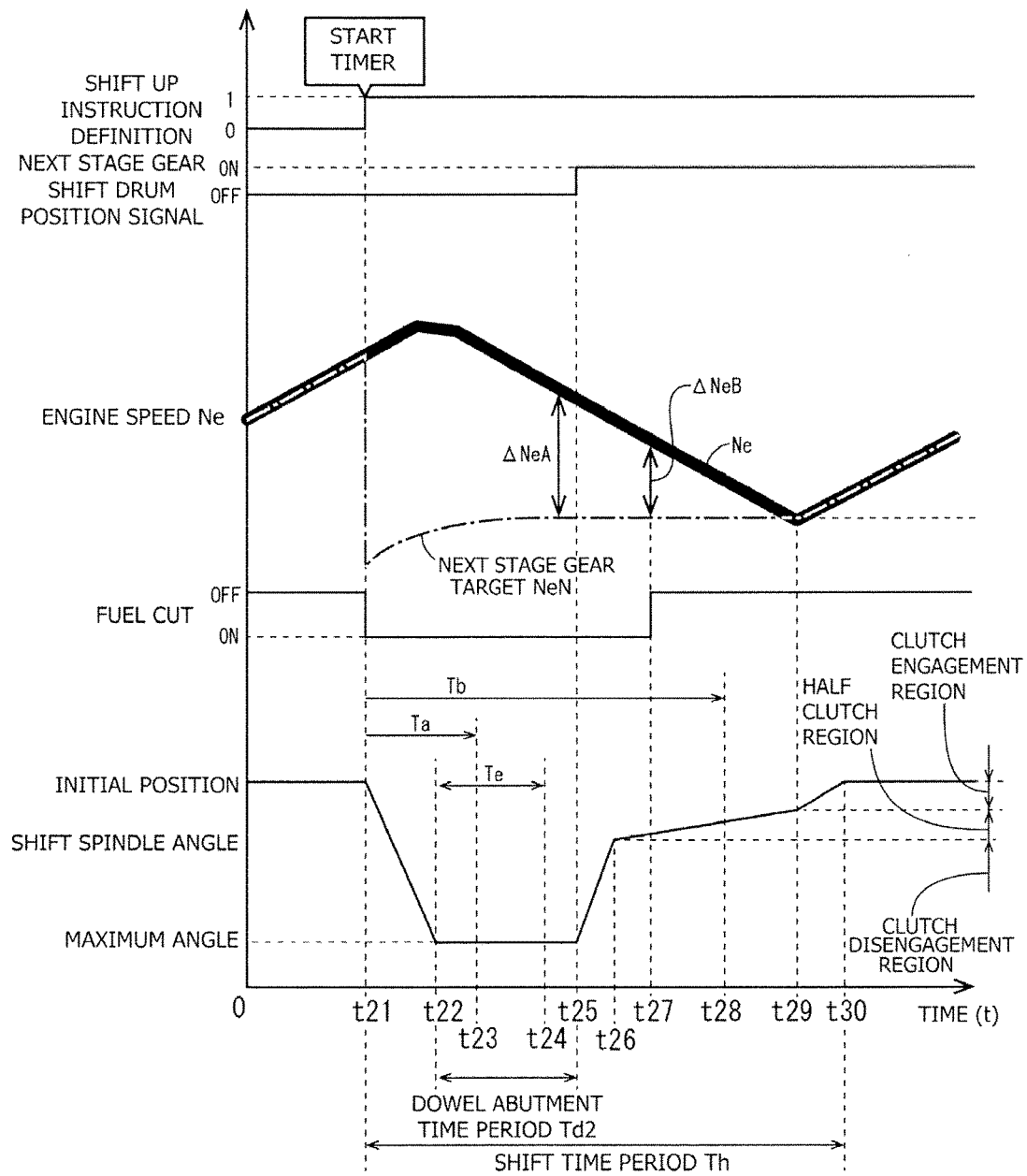
FIG. 7 is a time chart illustrating a further flow of fuel cut control (upon application of the control of the present application)

FIG. 7 illustrates a flow where, even if dowel abutment occurs, racing of the engine speed Ne does not occur by application of the control of the present application. The parameters upon starting of fuel cut control and the driving mode of the shift spindle 82 are similar to those in the case of FIG. 6.

In the control of the present application, at time t21 at which fuel cut control is started, measurement of the predetermined period of time by the timer 2 is started and besides the parameter $\Delta$NeA is derived using the normal state $\Delta$Ne table 4 and the parameter $\Delta$NeB is derived using the long dowel abutment state $\Delta$Ne table 5 described above. Then, when the dowel abutment time period is long, the parameter $\Delta$NeB is applied, but when no dowel abutment occurs, the parameter $\Delta$NeA is applied (same as in the example of FIG. 5) to determine an end timing of the fuel cut control.

At time t22, the shift spindle 82 reaches the maximum angle and the timer 2 for dowel abutment detection is started. Then at time t23, the elapsed time from time t21 reaches a minimum cut time period Ta (refer to FIG. 8) determined in advance as a minimum duration when then fuel cut is started. Then at time t24, the elapsed time from time t22 reaches a maximum dowel abutment time period Tc which is a parameter for decision regarding whether or not dowel abutment occurs. In other words, if the elapsed time passes time t24, then it is decided that the dowel abutment time period is long.

The fuel cut controlling unit 3 decides that the dowel abutment time period is long when the elapsed time passes time t24, and selects the parameter $\Delta$NeB, which is a value for prescribing a timing at which fuel cut control is to be ended and smaller than the parameter $\Delta$NeA. Consequently, the fuel cut controlling unit 3 continues the fuel cut control even if the difference between the engine speed Ne and the next stage gear target NeN becomes equal to the parameter $\Delta$NeA.

At time t25, the shift drum position signal of the third speed gear position is turned on, and consequently, control for returning the shift spindle 82 to its initial position is started. Then at time t26, the transmission clutch 53 enters a half clutch region from the disengagement region and a half clutch control in which the rotational speed is lowered is started.

At time t27 after time t26, the difference between the decreasing engine speed Ne (thick solid line) and the next stage gear target NeN (thin alternate long and short dash line) becomes equal to the value $\Delta$NeB, and the fuel cut control is ended. Consequently, fuel injection is re-started at time t27 at which the transmission clutch 53 is in the half clutch region already, and the shifting action can be completed smoothly. It is to be noted that, at time t28, the measurement time period from time t21 reaches a maximum cut time period Tb. The maximum cut time period Tb is set in order to re-start fuel injection compulsorily because, if the fuel cut control is continued for an excessively long period of time, then this has an influence on traveling with the next stage gear. In the example of FIG. 7, since the fuel cut control comes to an end before the maximum cut time period Tb is reached, no influence occurs on the fuel cut control.

At time t29, the half clutch region comes to an end and the transmission clutch 53 is placed into an engaged state. Within the period from time t29 to time t30, the rotational speed of the shift spindle 82 is raised to maintain the shift time period Th.

Figure 8:
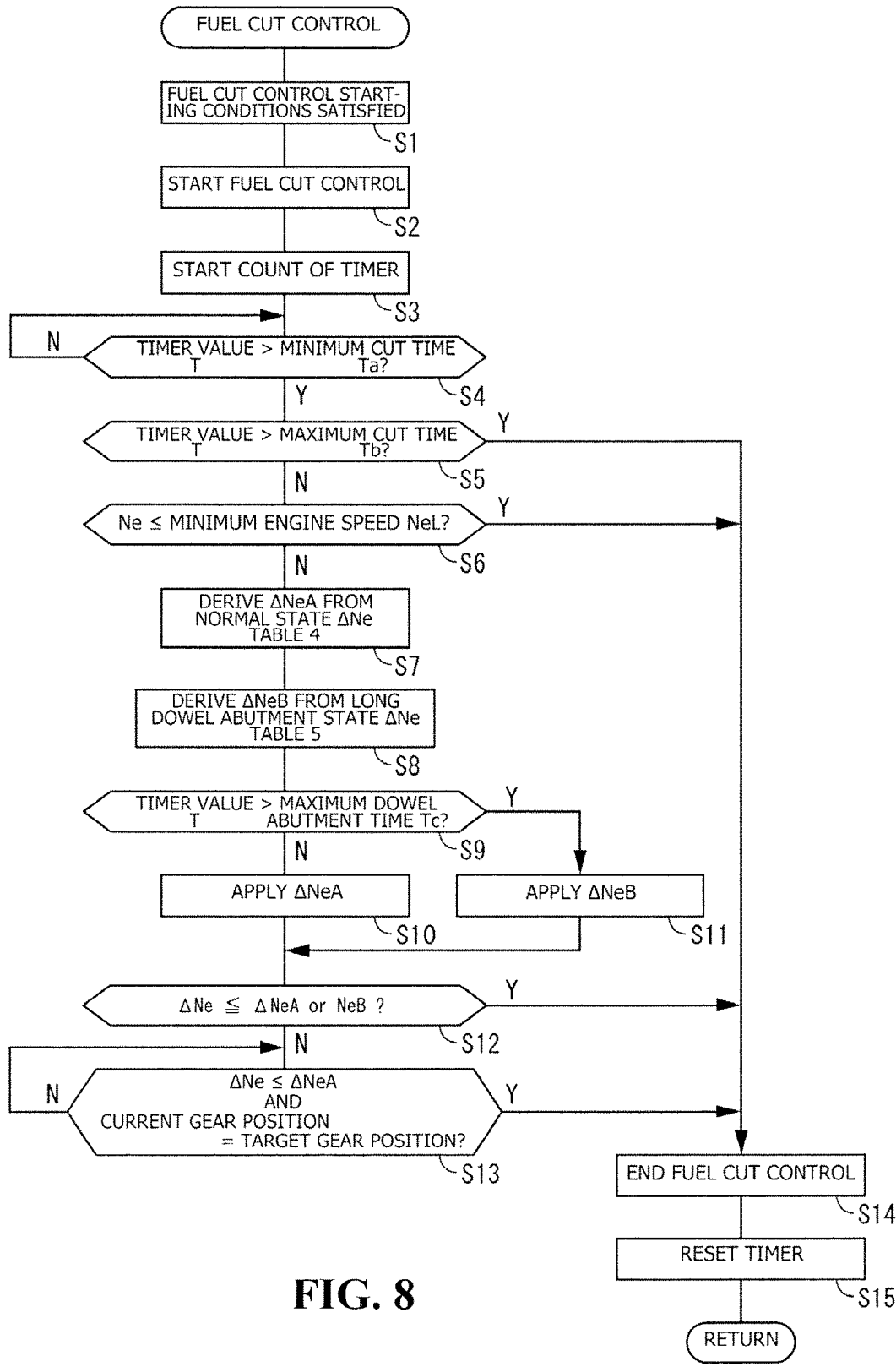
FIG. 8 is a flow chart illustrating a procedure of fuel cut control according to the present embodiment.

FIG. 8 is a flow chart illustrating a procedure of the fuel cut control according to the present embodiment. The flow chart corresponds to the flow depicted in the time charts of FIGS. 5 and 7.

At step S1, the starting conditions of the fuel cut control are satisfied, and fuel cut control is started at step S2. Simultaneously, counting by the timer 2 is started at step S3 (time t5 and time t21).

At step S4, it is decided whether or not a timer value T exceeds the minimum cut time period Ta, and if a negative decision is made, then it is determined that the fuel cut does not operate effectively as yet and the processing is returned to the decision at step S4. If an affirmative decision is made at step S4, then the processing advances to step S5.

At step S5, it is decided whether or not the timer value T exceeds the maximum cut time period Tb, and if a negative decision is made, then the processing advances to step S6. At step S6, it is decided whether or not the engine speed Ne is equal to or lower than a minimum engine speed NeL determined in advance, and if a negative decision is made, then the processing advances to step S7. If an affirmative decision is made at both of steps S5 and S6, then it is decided that the current state is not suitable for fuel cut, and the fuel cut control is ended at step S14.

At step S7, the parameter $\Delta$NeA is derived from the normal state $\Delta$Ne table 4, and at step 8, the parameter $\Delta$NeB is derived from the long dowel abutment state $\Delta$Ne table 5.

Then, at step S9, it is decided whether or not the timer value T exceeds the maximum dowel abutment time period Tc while the shift drum position signal of the next stage gear remains off. If an affirmative decision is made, then the processing advances to step S11, at which the parameter ΔNeB is applied. On the other hand, if a negative decision is made at step S11, namely, if the shift drum position signal of the next stage gear is turned on before the timer value T exceeds the maximum dowel abutment time period Tc, then the processing advances to step S10, at which the parameter ΔNeA is applied.

At step S12, it is decided whether or not the difference ΔNe which is the difference between the engine speed Ne and the next stage gear target NeN becomes equal to the value ΔNeA (normal state) or the value ΔNeB (when the dowel abutment time period is long). If an affirmative decision is made, then the fuel cut control is ended at step S14.

If a negative decision is made at step S12, then the processing advances to step S13, at which it is decided whether or not the parameter ΔNe is equal to or lower than the parameter ΔNeA and the current gear position comes to the target gear position. If an affirmative decision is made at step S13, then the fuel cut control is ended at step S14, but if a negative decision is made, then the processing returns to the decision at step S13. The decision at step S13 decides that, even if dowel abutment occurs and the parameter ΔNeB is applied, if the parameter ΔNe is equal to or lower than the value ΔNeA and the current gear position comes to the target gear position, then the fuel cut may be ended, and may be excluded from the flow chart of FIG. 8.

As described above, the fuel injection controlling apparatus according to the present invention is configured such that the transmission TM is a dog clutch type transmission wherein an arbitrary transmission gear pair is selected from the plurality of transmission gear pairs G1 to G5 and GR by engagement or disengagement of a clutch configured from dowels and dowel holes, and a shift state is detected from the length of the dowel abutment time period Td1 or Td2. Further, the fuel cut controlling unit 3 changes the condition for ending the fuel cut control, namely, the threshold value to be used for the decision of whether or not the fuel cut control is to be ended, in response to the shift state detected by the shift state detection unit 7. Therefore, a shift shock upon shift up shifting and racing of the engine speed can be prevented irrespective of whether the dowel abutment time period upon shifting is long or short.

It is to be noted that the structure or the form of the transmission or the transmission clutch, setting of the normal state ΔNe table and the long dowel abutment state ΔNe table, setting of the minimum cut time period Ta, maximum cut time period Tb, and maximum dowel abutment time period Tc and so forth are not limited to those in the embodiment but can be modified in various manners.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection controlling apparatus comprising:
   a fuel cut controlling unit applied to a power unit which includes an engine and a transmission of a stepped type and configured to perform fuel cut control of a fuel injection apparatus upon shifting of the transmission; and
   a shift state detection unit configured to decide a shift state of the transmission;
   wherein the fuel cut controlling unit is configured to change a decision threshold value to be used for a decision of whether or not the fuel cut control is to be ended in response to the shift state detected by the shift state detection unit,
   wherein:
      the transmission is a dog clutch type transmission configured to select an arbitrary one of a plurality of transmission gear pairs through engagement or disengagement of a dog clutch configured from dowels and dowel holes; and
      the shift state is indicated by a length of a dowel abutment time period for which a state in which the dowels abut with a side wall of a transmission gear upon shifting continues.

2. The fuel injection controlling apparatus according to claim 1, further comprising:
   a shift drum position sensor configured to detect a rotational angle of a shift drum of the transmission; and
   a shift spindle position sensor configured to detect a rotational angle of a shift spindle for rotating the shift drum;
   wherein the decision of whether or not the dog clutch is in a in the dowel abutment state is performed by comparison between an output signal of the shift drum position sensor and an output signal of the shift spindle position sensor.

3. The fuel injection controlling apparatus according to claim 2, wherein the decision threshold value to be used for the decision of whether or not the fuel cut control is to be ended is given as a speed difference between an engine speed at present and a target engine speed of the gear after shift up shifting.

4. The fuel injection controlling apparatus according to claim 3, wherein when the dowel abutment time period is long, the speed difference is set smaller than that when the dowel abutment time period is short.

5. The fuel injection controlling apparatus according to claim 4, wherein the fuel cut controlling unit decides that the dowel abutment time period is long when the dowel abutment time period exceeds a maximum dowel abutment time period set in advance.

6. The fuel injection controlling apparatus according to claim 1, wherein the decision threshold value to be used for the decision of whether or not the fuel cut control is to be ended is given as a speed difference between an engine speed at present and a target engine speed of the gear after shift up shifting.

7. The fuel injection controlling apparatus according to claim 6, wherein when the dowel abutment time period is long, the speed difference is set smaller than that when the dowel abutment time period is short.

8. The fuel injection controlling apparatus according to claim 7, wherein the fuel cut controlling unit decides that the dowel abutment time period is long when the dowel abutment time period exceeds a maximum dowel abutment time period set in advance.

9. The fuel injection controlling apparatus according to claim 8, wherein when a duration after the fuel cut control is started exceeds a minimum cut time period set in advance, the fuel cut controlling unit decides whether or not the dog clutch is in the abutment state, and when the duration is equal to or shorter than the speed difference and the dog clutch is not in the dowel abutment state, the fuel cut controlling unit ends the fuel cut control.

10. A fuel injection controlling apparatus comprising:
a power unit including an engine and a transmission;
a fuel injection apparatus for selectively injecting fuel to said engine;
a fuel cut controlling unit applied to the power unit, said fuel cut controlling unit performing a fuel cut control of the fuel injection apparatus upon shifting of the transmission; and
a shift state detection unit for deciding a shift state of the transmission;
wherein the fuel cut controlling unit changes a decision threshold value to be used for a decision of whether or not the fuel cut control is to be ended in response to the shift state detected by the shift state detection unit,
wherein:
  the transmission is a dog clutch type transmission configured to select an arbitrary one of a plurality of transmission gear pairs through engagement or disengagement of a dog clutch configured from dowels and dowel holes; and
  the shift state is indicated by a length of a dowel abutment time period for which a state in which the dowels abut with a side wall of a transmission gear upon shifting continues.

11. The fuel injection controlling apparatus according to claim claim 10, further comprising:
a shift drum position sensor configured to detect a rotational angle of a shift drum of the transmission; and
a shift spindle position sensor configured to detect a rotational angle of a shift spindle for rotating the shift drum;
wherein the decision of whether or not the dog clutch is in a in the dowel abutment state is performed by comparison between an output signal of the shift drum position sensor and an output signal of the shift spindle position sensor.

12. The fuel injection controlling apparatus according to claim 11, wherein the decision threshold value to be used for the decision of whether or not the fuel cut control is to be ended is given as a speed difference between an engine speed at present and a target engine speed of the gear after shift up shifting.

13. The fuel injection controlling apparatus according to claim 12, wherein when the dowel abutment time period is long, the speed difference is set smaller than that when the dowel abutment time period is short.

14. The fuel injection controlling apparatus according to claim 13, wherein the fuel cut controlling unit decides that the dowel abutment time period is long when the dowel abutment time period exceeds a maximum dowel abutment time period set in advance.

15. The fuel injection controlling apparatus according to claim 10, wherein the decision threshold value to be used for the decision of whether or not the fuel cut control is to be ended is given as a speed difference between an engine speed at present and a target engine speed of the gear after shift up shifting.

16. The fuel injection controlling apparatus according to claim 15, wherein when the dowel abutment time period is long, the speed difference is set smaller than that when the dowel abutment time period is short.

17. The fuel injection controlling apparatus according to claim 16, wherein the fuel cut controlling unit decides that the dowel abutment time period is long when the dowel abutment time period exceeds a maximum dowel abutment time period set in advance.

18. The fuel injection controlling apparatus according to claim 17, wherein when a duration after the fuel cut control is started exceeds a minimum cut time period set in advance, the fuel cut controlling unit decides whether or not the dog clutch is in the abutment state, and when the duration is equal to or shorter than the speed difference and
the dog clutch is not in the dowel abutment state, the fuel cut controlling unit ends the fuel cut control.

* * * * *